US011803713B2

(12) United States Patent
Hodges et al.

(10) Patent No.: US 11,803,713 B2
(45) Date of Patent: Oct. 31, 2023

(54) CHARGING TERMINAL

(71) Applicant: Miura Systems Limited, High Wycombe (GB)

(72) Inventors: Andrew Graham Hodges, Aylesbury (GB); Enrique Garrido, High Wycombe (GB); Darren Leigh Shaw, Houghton-le-Spring (GB); Matthew Michael James Watts, Maidenhead (GB)

(73) Assignee: Miura Systems Limited, High Wycombe (GB)

( * ) Notice: Subject to any disclaimer, the term of this patent is extended or adjusted under 35 U.S.C. 154(b) by 219 days.

(21) Appl. No.: 17/357,172

(22) Filed: Jun. 24, 2021

(65) Prior Publication Data

US 2021/0319190 A1    Oct. 14, 2021

Related U.S. Application Data

(63) Continuation of application No. 16/346,973, filed as application No. PCT/GB2017/053358 on Nov. 8, 2017, now Pat. No. 11,068,670.

(30) Foreign Application Priority Data

Nov. 8, 2016   (GB) .................................... 1618810

(51) Int. Cl.
 *G06K 7/00*   (2006.01)
 *G06F 13/42*  (2006.01)
(52) U.S. Cl.
 CPC ....... *G06K 7/0013* (2013.01); *G06F 13/4282* (2013.01); *G06F 2213/0042* (2013.01)
(58) Field of Classification Search
 None
 See application file for complete search history.

(56) References Cited

U.S. PATENT DOCUMENTS 5,317,691 A * 5/1994 Traeger ............... B60R 11/0241
                                                        710/72
5,574,270 A   11/1996 Steffen
          (Continued)

FOREIGN PATENT DOCUMENTS

DE   195 42 262 A1   5/1996
EP   0 762 307 A2    3/1997
GB   2 374 183 A     10/2002

OTHER PUBLICATIONS

May 5, 2017—UK Search Report—GB1618810.4.
Feb. 7, 2018—ISR & WO—PCT/GB2017/053358.

*Primary Examiner* — Thien M Le
*Assistant Examiner* — April A Taylor
(74) *Attorney, Agent, or Firm* — Banner & Witcoff, Ltd.

(57) ABSTRACT

A battery-powered device comprising a power input providing power to the device is described herein, with a housing having an opening for receiving a smartcard. There may be at least one electrical contact within the housing, the at least one electrical contact connected to the power input. There is also provided a power supply for one or more battery-powered devices each having at least one electrical contact within a housing configured to make contact with a smartcard introduced into an opening in the housing, the power supply comprising a power input (e.g., a wire or circuit). There may be an electrical output connected to the power input. One or more paddles may be included, each having at least one electrode connected to the electrical output, wherein each paddle is configured to enter an opening of a battery-powered device for receiving a smartcard, wherein the at least one electrode is configured to provide electrical power from the power input to the at least one electrical contact to provide electrical power the battery-powered device.

19 Claims, 7 Drawing Sheets

(56) References Cited

U.S. PATENT DOCUMENTS

| | | | |
|---|---|---|---|
| 6,027,028 A | | 2/2000 | Pieterse et al. |
| 7,350,705 B1 | | 4/2008 | Frederick et al. |
| 8,060,141 B2 | * | 11/2011 | Lo ........................ G06K 7/0008 455/435.1 |
| 9,917,455 B1 | * | 3/2018 | Shipman ................ H02J 7/0044 |
| 2009/0172279 A1 | * | 7/2009 | Yuan ................ G06K 19/07741 711/E12.001 |
| 2010/0065626 A1 | | 3/2010 | Hammad |

\* cited by examiner

CHARGING TERMINAL

CROSS REFERENCE TO RELATED CASES

This application is a continuation of U.S. application Ser. No. 16/346,973, filed May 2, 2019, which claims priority to PCT Application No. PCT/GB2017/053358, filed Nov. 8, 2017, which claims priority to United Kingdom Application No. 1618810.4 filed Nov. 8, 2016, hereby incorporated by reference in its entirety for all purposes.

FIELD OF THE INVENTION

The present invention relates to a battery powered device and power delivery terminal or dock and in particular, a portable payment terminal and charging system.

BACKGROUND OF THE INVENTION

Mobile Point of Sale terminals have a battery which needs to be charged periodically. These devices therefore need a way to accept power (typically 5V). This can be done with a cable, such as a USB cable, or with a charging dock. Use of a USB cable may be appropriate for occasional use, but for larger retailers a charging dock is more reliable and convenient. Terminals may be stored on the dock when not in use, may be added and removed quickly and easily and may be charged more rapidly than by using a USB port.

Use of fast-charge docks (with increased current) requires connection points on the terminal and on the dock. This may require at least the terminals or dock to have some form of spring-loaded contacts. This adds cost to both to the terminal and to the dock, makes the mechanical design of both parts more complicated and challenging and may detract from the appearance of the terminal. The size of mobile terminals may also be of key importance and the addition of changing contacts can increase the size of the terminal.

Charging contacts may also become dirty or damaged and this can result in failure of the terminal or charging process.

Another problem that may be encountered for larger businesses is the need to simultaneously charge several terminals. This may require docks with several sets of contacts, which increases the size of the dock taking up room in a retail environment (e.g. on or behind a payment desk).

Therefore, there is required a device and system that overcomes these problems.

SUMMARY OF THE INVENTION

A device, portable device, or battery-powered device contains an interface including electrical contacts providing the device with the ability to interact electronically with a smartcard. A smartcard may be formed from an integrated circuit or chip and contacts embedded within a support formed from a plastics material. In particular implementations the smartcard is a payment card, such as a credit or debit card that facilitates "chip" transactions. The device has a slot, aperture or opening for inserting the smartcard and the electronic contacts within the device touch electrodes or pads on the surface of smartcard when inserted.

Typically, the electronic contacts only make contact with the smartcard. The electronic contacts are therefore protected or hidden to avoid damage or dirt from interfering with them. When the device requires power (e.g. to charge a battery or provide power to run electronic processes or provide power to other connected devices) then one or more of the electrical contacts may also accept electrical power, which may then be used to charge the battery and/or provide power for other functions.

In one implementation, the particular electrical contact or contacts make contact with electrodes on a smartcard that may be redundant (or only used for particular purposes). Nevertheless, a smartcard reader may need to provide electrical contacts for all smartcard electrodes. A further option is for one or more contacts to be powered with the same voltage (e.g. a positive or negative voltage). Another part of the device (e.g. plate or chassis) may receive the opposing voltage (e.g. 0V or ground). DC or AC current may be used.

Where the device is a payment terminal then the same aperture or slot that receives payment cards may also be used to provide electrical power through the same contacts used to interface with a smartcard or other integrated circuit or through dedicated or separate power contacts within the same space as that is used to receive the payment cards (i.e. that would not contact pads on the payment card or smartcard).

A corresponding power, charging terminal or dock provides one or more planar protrusions, plates, or paddles that are inserted into the device (again through the same aperture as used to receive a smartcard). The planar protrusions may have at least a part of them that may have the shape and size of a smartcard with powered electrodes located at a position may that be taken by one or smartcard contact pads on a payment card (or at least one or more of the electrodes). Alternatively, the planar protrusions have a different shape but still fit in to the aperture. The planar protrusion then takes the place of the payment card or smartcard when inserted into the device and the powered electrode or electrodes take the place of contacts on the surface of the smartcard. Electrical power is then provided to the device through the powered electrodes into the electrical contact or contacts within the device. This removes the need to have a separate charging interface, spring loaded contacts or other apertures in the device. This can be particularly important for fast or high current charging. The smartcard interface within the device may be designed for many thousands or hundreds of thousands of insertions. Therefore, the device may have a more robust charging interface then a dedicated charging port. Alternatively, the powered electrodes may be located at a position that corresponds with another location (i.e. not corresponding with the smartcard's contacts). In this case, further contact points dedicated to receiving power may be located within the device and the electronic contacts that usually align with the smartcard's pads are not used to receive power.

The planar protrusion or paddle may also support the device when inserted. Therefore, an array of planar protrusions having powered electrodes (on one or both sides) may provide a convenient way to charge multiple devices. This also reduces the space needed to charge several devices, which may now be located very close together.

In accordance with a first aspect there is provided a battery-powered device comprising:
 a power input providing power to the device;
 a housing having an opening for receiving a smartcard;
 at least one electrical contact within the housing, the at least one electrical contact connected to the power input. Therefore, power may be supplied without requiring a further aperture or port and the power connections may be kept cleaner and safer. The power input may be within the housing. The power input may also be regulated.

Optionally, the opening in the housing may be configured to receive a payment card having a smartcard. The opening may accept a card 53.98 mm to 55 mm or 56 mm wide and 0.76 mm thick (+/−0.1 to 0.3 mm), for example. In one example the opening may be 55-70 mm wide and 2-6 mm thick. The opening may include a widened part, (e.g. an additional 21-25 mm wide portion having an additional thickness of 0.5 to 1 mm or 0.5 mm to 2 mm) corresponding an area on a payment card where characters are embossed (e.g. card number, name and expiry date on a payment card). A smartcard aperture is used to supply power to the device. Therefore, any aperture which can take and talk to an ISO7816 card may be used regardless of size or shape.

Optionally, the at least one electrical contact may be further configured to electrically connect to at least one conductive pad on the surface of a smartcard introduced into the opening of the housing. Therefore, the electrical contact of the device may have a dual use of connecting to smartcard pad (either used or redundant) and connecting to a power supplying electrode.

Advantageously, the at least one electrical contact may be further configured to make contact with (or pass over) a non-conductive region on the surface of a smartcard introduced into the opening of the housing. In other words, in this particular example implementation, as a smartcard is inserted into the opening then the electrical contact(s) within the device only makes contact with (or passes over) an insulating part of the smartcard both during the insertion procedure and when it is fully inserted. When a charging paddle is inserted, its own power supplying electrodes may then similarly miss the contacts within the device intended to make electrical contact with the pads on the smartcard.

Optionally, the at least one electrical contact may be further configured to electrically connect to a paddle introduced into the opening of the housing, wherein the paddle is arranged to provide electrical power to the at least one electrical contact.

Optionally, the smartcard may be an ISO/IEC 7816 or equivalent payment card.

Optionally, the battery-powered device may further comprising a conductive plate separated from and opposite to the at least one electrical contact, the conductive plate connected to an electrical ground (or a power line) of the battery-powered device. Other metal or conductive parts within the device may also be used as a power or ground contact.

Optionally, the battery-powered device may be a portable payment terminal.

Optionally, the battery-powered device may further comprise an interface configured to supply electrical power received from the at least one electrical contact to a second device. In one example, the second device may be an additional or second battery that may receive power when the device is charging and supply power to the device when the device is not charging and/or when the device's primary battery is low or exhausted.

Optionally, the battery-powered device may further comprise a circuit configured to control or manage the electrical power provided to the second device.

Optionally, the control may include limiting the electrical power provided to the second device in favour of charging a battery within the battery-powered device, limiting the electrical power to charge the battery within the battery-powered device in favour of providing electrical power to the second device and/or preventing electrical power from reaching the second device.

Optionally, the battery-powered device may further comprise a connector for attaching the second device.

Optionally, the battery-powered device may further comprise a case for joining the battery-powered device to the second device.

Optionally, the interface may be a USB interface.

Optionally, the battery-powered device may further comprise a battery in electrical contact with the power input. The battery may be rechargeable (e.g. Lithium ion).

Optionally, the at least one electrical contact may be a spring-loaded contact, copper, nickel and/or gold plated.

Optionally, the opening may be configured to accept an ISO 7810 ID-1 type card entered edge-wise. The opening may be flared or widened (and then narrowed to guide in a card) to more easily accept a card or paddle.

Optionally, the battery-powered device may further comprise a battery charging circuit connected to the power input.

Preferably, the at least one electrical contact within the housing may be configured to make contact with a smartcard introduced into the opening of the housing.

Optionally, the contact between the electrical contact and the smartcard may be an electrical connection. The electrical contact may make an electrical connection with a corresponding contact pad on the smartcard or may not be in electrical contact (only physical contact) with the smartcard.

In accordance with a second aspect, there is provided a power supply, dock, charging dock or charging terminal for one or more battery-powered devices each having at least one electrical contact within a housing configured to make contact with a smartcard introduced into an opening in the housing, the power supply comprising:

a power input (e.g. a wire or circuit);
an electrical output connected to the power input; and
one or more paddles, each having at least one electrode connected to the electrical output, wherein each paddle is configured to enter an opening of a battery-powered device for receiving a smartcard, wherein the at least one electrode is configured to provide electrical power from the power input to the least one electrical contact to provided electrical power the battery-powered device. This (and its variations) may be used with and combined with any one or more of the previously described battery-powered devices.

Optionally, the power supply may further comprise a battery charging circuit, current and/or voltage regulation circuit connecting the power input to the electrical output.

Optionally, the plate may be a non-conductive paddle.

Optionally, the paddle may be formed from a plastics material. Other materials may be used including metal, composite, ceramics, etc.

Optionally, the paddle may have a width and/or thickness of an ISO 7810 ID-1 type card. Its length may be shorter than an ID-1 type card (or any other length), and wherein the at least one electrode may be located on the paddle at a position corresponding with a location of a smartcard on the ID-1 type card (or at another location).

Optionally, the ID-1 type card may be an ISO/IEC 7816, payment card or ID card or equivalent card.

Optionally, a plurality of similar paddles may be arranged spaced apart and parallel to each other. For example, this may be as a line, grid or in a linear series.

Optionally, the paddles may be spaced apart to accommodate a plurality of battery-powered devices to be placed on each paddle with a paddle inserted into the opening of each housing and charged simultaneously.

Optionally, the one or more paddles and electrodes may be formed from printed circuit boards.

Optionally, the one or more paddles may have two electrodes located on opposite faces. Both electrodes may be on the same side in other examples.

Optionally, the output may be configured to provide one electrode with 5V and the other electrode is grounded.

Optionally, the grounded electrode may be configured to make electrical contact with a conductive paddle separated from and opposite to the plurality of electrical contacts within the battery-powered device.

Preferably, the power supply may further comprise a regulator circuit arranged to regulate electrical power supplied to the power input.

Optionally, the regulator circuit may be disconnectable from the power input. This may be an electrical plug and socket, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

A point of sale (POS) terminal has a smartcard connector, which contains spring-loaded contacts. This is used to power and communicate with a customer's smartcard during a transaction. Some smartcard connectors also contain a metal plate or chassis on the opposite side of the card to the contacts. Three of the eight contacts (C4, C6 and C8) are not or rarely used by payment cards or POS terminals and so may be used to accept power. The metal plate, if present may also be used in a similar way.

An example implementation is shown, where docking the terminal connects smartcard contacts C4 and C8 to 5V, and connects the metal plate in the connector to 0V (GND). Charging current therefore flows from a power supply, into C4 and C8, into the terminal (and its battery) and back to the power supply via the metal plate.

The charging station or dock may have one or multiple charging "paddles" or plates, with 5V on one side and 0V on the other provided by surface electrodes. Each terminal may be placed on a paddle. This arrangement allows numerous terminals to be placed one behind the other in a small footprint and does not require the dock to be attached to a counter or wall.

The paddles may be made of various materials, but one example is standard double-sided printed circuit board.

The figures illustrate this example implementation in more detail although other alternative configurations or combination of features (i.e. picked and combined with any example) may be used.

Figure 1A:
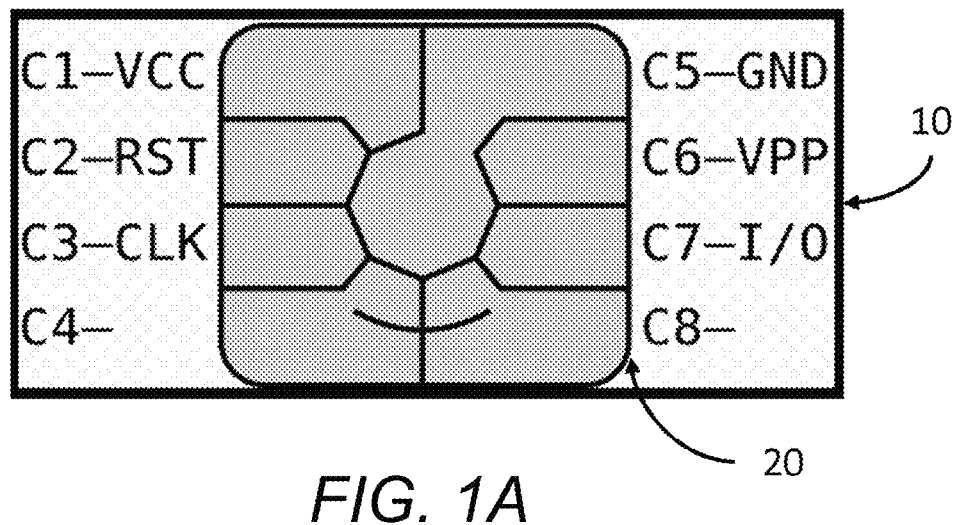
FIG. 1A shows a schematic diagram of typical smartcard contacts.

FIG. 1A shows a schematic diagram of a a series of contact pads or electrodes 20. These contact pads 20 provide electrical connectivity when inserted into a reader to provide a communication interface between a smartcard and a host, such as a POS terminal, for example. Such smartcards may conform to an international standard such as ISO/IEC7816-2: 2007, which defines the dimensions and locations of contacts on an integrated circuit card that may be used with an ID-1 card type (e.g. payment or ID card). FIG. 1A shows an example pin layout of the contact pads 20 and their uses or assignments.

It is noted that at least contacts C4 and C8 are unused or unassigned in this example.

Figure 1B:
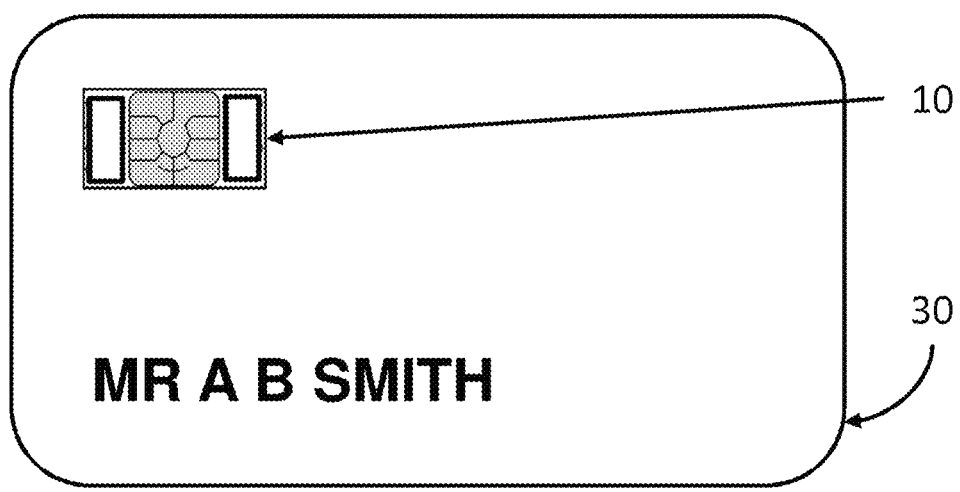
FIG. 1B shows a schematic diagram of a payment card supporting the smartcard contacts of FIG. 1A.

FIG. 1B shows a schematic diagram of a payment card 30 with smartcard contact pads 20 described with reference to FIG. 1A. Again, the location and orientation of the smartcard 10 within the payment card 30 may conform to an international standard (e.g. ISO/IEC7816-1 to 15).

Therefore, smartcard readers such as payment terminals, ATM machines and other devices may have corresponding contacts to interface with the contact pads 20 of the smartcard 10. Whilst not all contact pads or electrodes 20 may be required for use in a transaction, terminals and interfaces within terminals often retain the ability to make individual contact with these pads for potential future purposes.

Figure 2:
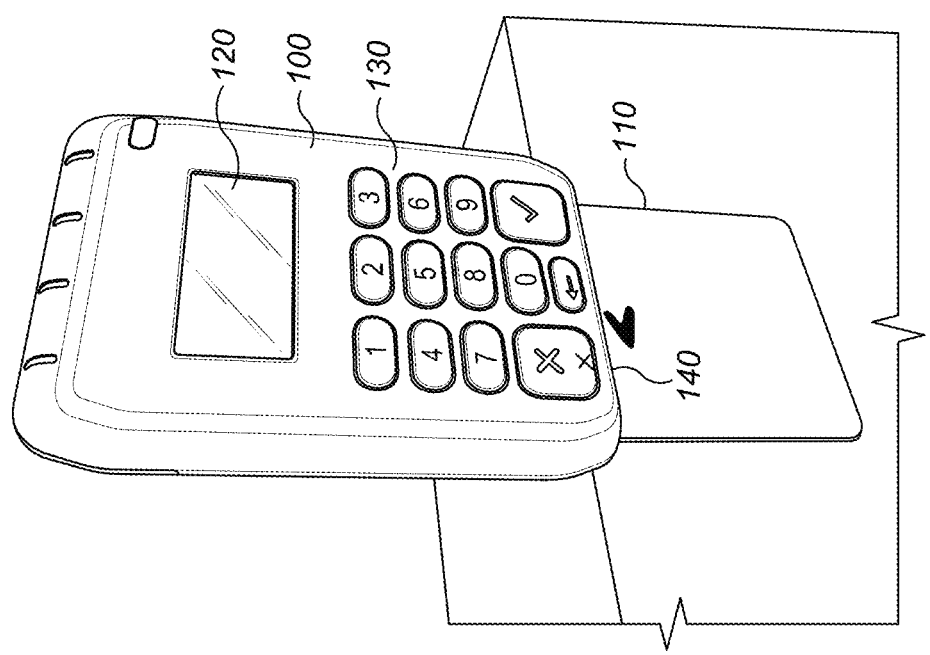
FIG. 2 shows a view of a battery powered device and a portion of a charging system.

FIG. 2 shows an example card reader, terminal or device 100 that includes a screen 120, a keypad 130 and a slot or aperture 140 for accepting a payment card 30 having a smartcard 10. In this diagram, a portion of a power or charging terminal or dock fits into the slot 140 where the payment card 30 would usually be inserted. This portion of the charging dock takes the form of a plate or paddle 110, which has the thickness and width of a payment card 30 (e.g. a credit card or debit card). The paddle 110, when inserted into the payment terminal 100 may support the payment terminal 100 in an upright or substantially upright position with the slot or aperture 140 facing down towards a table, counter, till or the ground. Whilst this example uses a payment terminal 100, the same principle may be used with any device that requires power, such as a battery powered or non-battery powered device or portable device, for example. In an example implementation the device 100 includes a reader module for interfacing with a smartcard.

Figure 3:
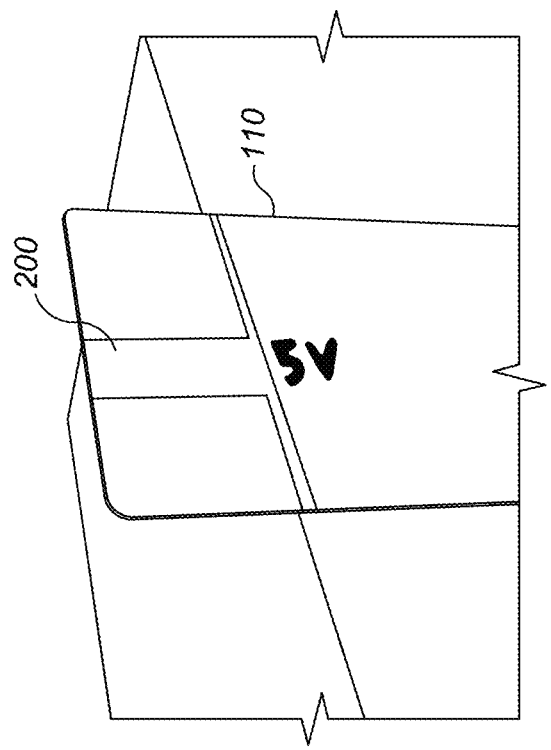
FIG. 3 shows a portion of the charging system shown in FIG. 2.

FIG. 3 shows the paddle 110 in more detail and includes a single electrode 200 on a front face of the paddle 110. A further electrode is also formed on the opposing or rear face of the paddle 110, but this is not shown in this figure. The electrode or electrodes 200 are located on the paddle 110 so that when the device 100 receives the paddle 110 through its aperture, opening or slot 140, then the electrode 200 makes contact with one or more electrical contacts within the device 100 that would otherwise make contact with one or more of the contact pads 20 of the smartcard 10. As shown in this example implementation, the electrode 200 supplies a DC current to the contact or contact pads of the smartcard 10. In this example, the voltage is 5V, but other voltages and polarities (−ve or +ve) may be used.

Other components of the charging dock are not shown in this particular figure, but may include a power supply, voltage regulator, charging circuit or other electronic components to provide electrical power to the electrode 200 on the paddle 110. Such a circuit (not shown in this figure) may also detect the presence of a device 100 and initiate power to the electrode 200 in response, for example. Whilst the charging dock may regulate the power or include a charging circuit, such regulation may instead or additionally take place within the device. In an example implementation, voltage regulation may be provided by a lumpy lead or other external component.

Figure 4B:
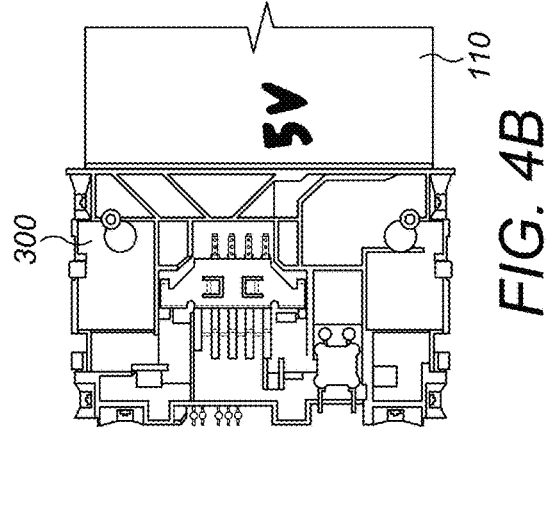
FIGS. 4A to 4D show a series of images illustrating the insertion of a portion of a charging system into a part of the battery powered device of FIG. 2.
Figure 4D:
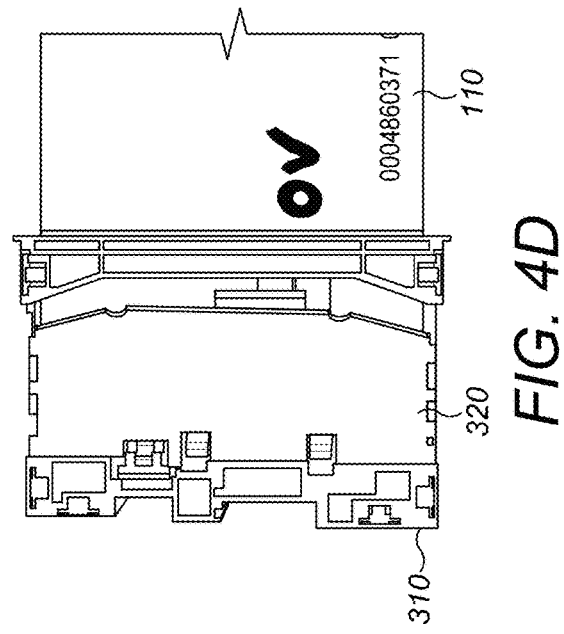
Figure 4A:
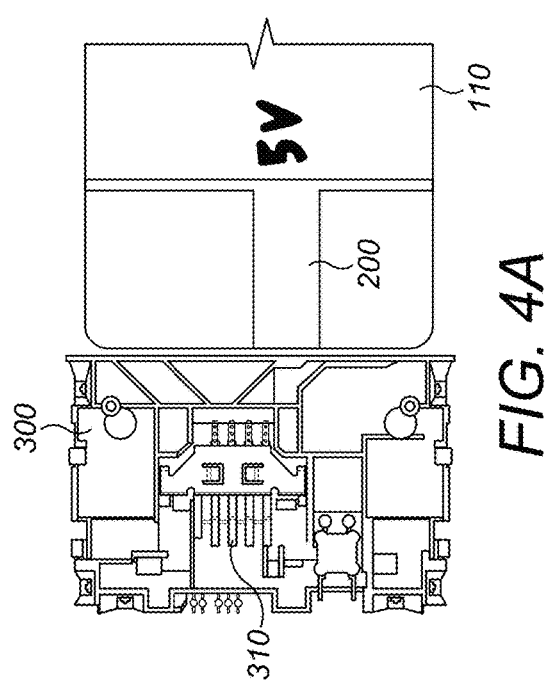

FIGS. 4A to 4D show a series of images illustrating how the paddle 110 inserts into a reader module 300 of the device 100 (not shown in these figures). As can be seen in FIGS. 4A and 4B, the reader module 300 includes a series of electrical contacts (which in this case, are spring-loaded electrical contacts) 310 located on the reader module 300 so that when a payment card 30 is inserted, each electrical contact 310 makes contact with one of the contact pads 20 on the smartcard 10. In this example, there are eight contact pads 20 and eight electrical contacts 310 within the reader module 300.

As shown in FIG. 4A, the paddle 110 is not inserted into the reader module 300 but this illustrates that the electrode 200 will contact two of the electrical contacts that correspond with two contact pads 20 of a smartcard 10 (the paddle 110 may be introduced from right to left into the reader module 300 shown in this series of figures). One or more of the electrical contacts may be connected to a power input of the device 110. The power input provides power to the device 100, which may be used for any purpose including charging a battery (not shown in this figure).

FIG. 4B shows the paddle 110 partially inserted into the reader module 300, which now covers the electrode 200.

Figure 4C:
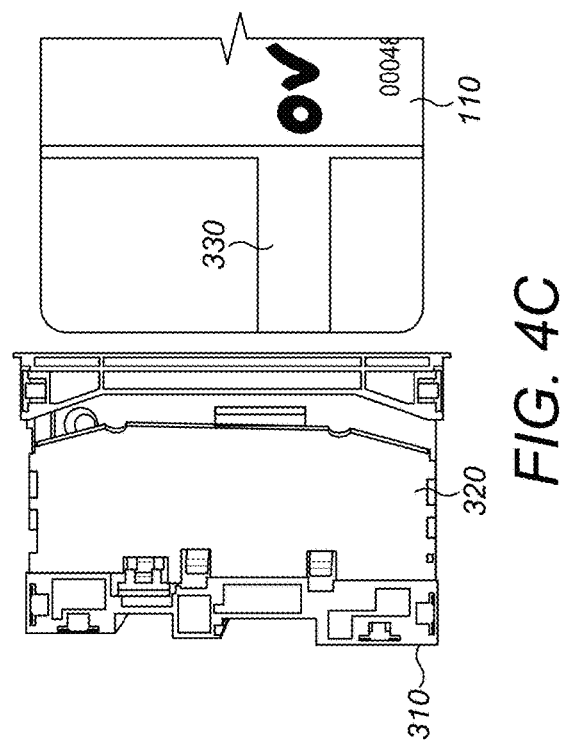

FIG. 4C shows a reverse side of both the reader module 300 and the paddle 110. On this reverse side of the paddle 110, there is a further electrode 330, which provides a ground or 0V supply. On the reverse or opposite side of the reader module 300 there is found a metal plate 320, which forms a part of a chassis or enclosure of the reader module 300. FIG. 4D shows the paddle 110 partially inserted into the reader module 300. As can be seen from this reverse or rear view, the ground electrode 330 makes contact with the metal plate 320. Therefore, 5V or a positive supply may be provided to one or more electrical contacts of the reader module and a ground supply of the charging dock may be provided to the ground plate or metal plate 320 of the reader module 300 allowing current to flow in and out of the device (not shown in this figure).

The particular electrical contacts that interface with the electrode 200 of the paddle 110 may be connected to a power supply input within the device 100. This may be provided directly to a battery or charging circuit or other control electronics within the device 100 or be regulated separately. The power supply may be mains powered, such as a switchmode AC to DC supply.

Figure 5:
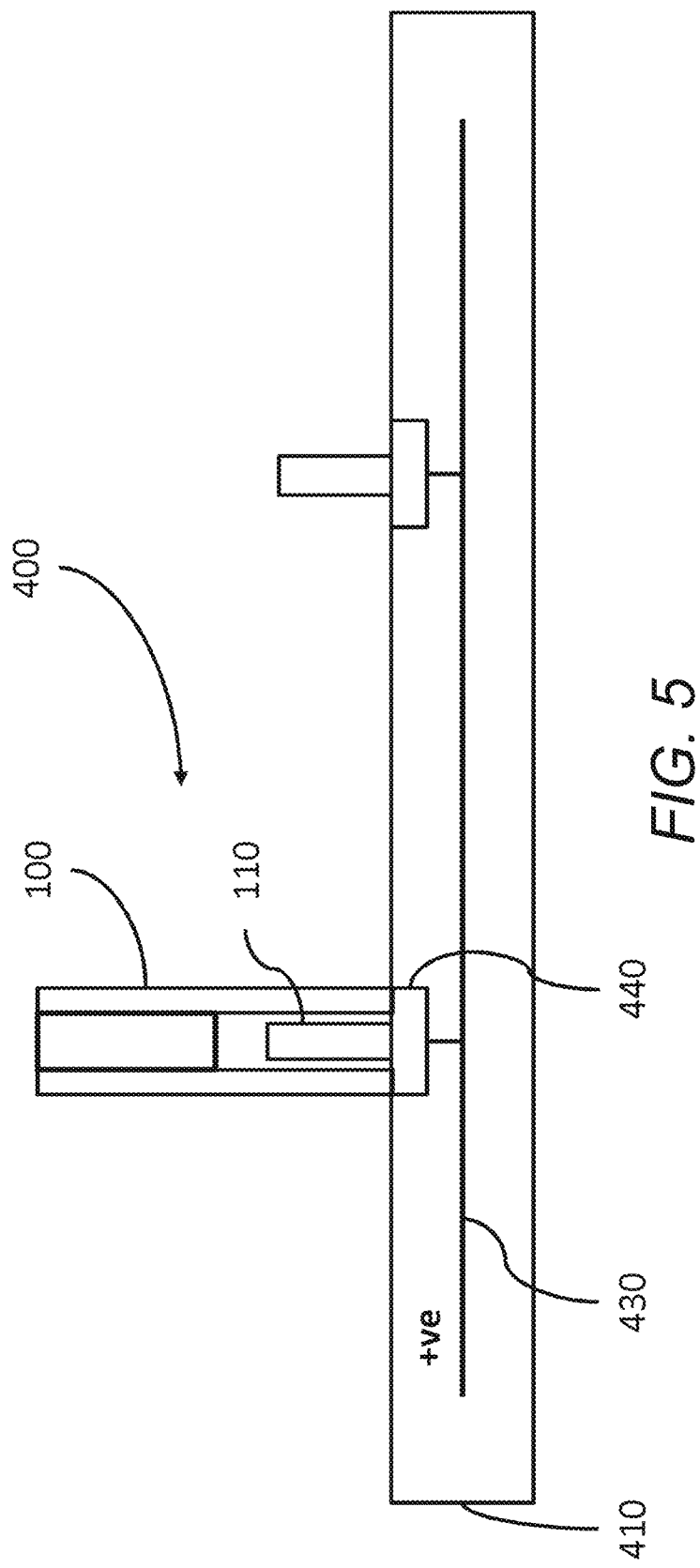
FIG. 5 shows a schematic sectional view of an edge of the battery powered device and charging system of FIG. 2.

FIG. 5 shows a sectional view of parts of a charging or power system 400 including the charging dock 410 supporting one or more paddles 110 and an electrical supply or power input 430 (partially shown) that provides electrical power to the electrodes (not shown in this figure) on the surface of the paddles 110 through an edge connector or electrical output 440. The edge connector 440 also physically supports the plate 110 and is fixed to a base of the charging dock 410. Whilst two paddles 110 are shown in this example, any number of paddles may be included. In this diagram, a single paddle 110 supports a device 100 with the paddle 110 inserted into the opening slot or aperture 140 of the device 100. As can be seen schematically in FIG. 5, the paddle 110 does not need to extend fully into the device for its electrode(s) 210, 330 to make electrical contact with one or more contacts within the device 100. The length of the paddle 110 may be formed accordingly. In some implementations, the length of the paddle 110 may be such that it cannot fully enter the device 110 or the paddle 110 may be prevented from entering far enough to hit an internal contact or micro switch (not shown in this figure) that usually registers the presence of a smartcard (e.g. a payment card). This is advantageous as the device 100 (e.g. payment terminal) does not expect to read a smartcard (e.g. process a payment) when it is being powered or charged from the dock 410 because the paddle 110 has not hit such a switch or other detector.

For example, the length of the paddle 110 that may be inserted into the slot or opening of the device 100 may be 25 mm (or anywhere from 5 mm to 100 mm). The paddle may also have rounded corners. The radius of such corners (e.g. two corners) may be 2.88 mm or greater (e.g. up to or beyond 10 mm) to help with insertion. Other shapes may be used that may also aid insertion (e.g. tapered edges).

It would also be possible to charge other devices, which are attached to the device 100. Power can flow into the device 100 and the device 100 can then supply power to the attached device (such as a tablet or phone).

The paddles in the charging dock may be formed from printed circuit boards (PCB), preferably but not limited to having no electronic components. The dock may contain a mother-board with one or multiple PCB edge connectors. Each changing paddle PCB may then slot into the motherboard connector(s). This would allow: user replacement, customer branding (silkscreen imaging), colour changes (solder resist) and replacement with extended versions if required (e.g. to allow for a phone or second device to be added).

Figure 6:
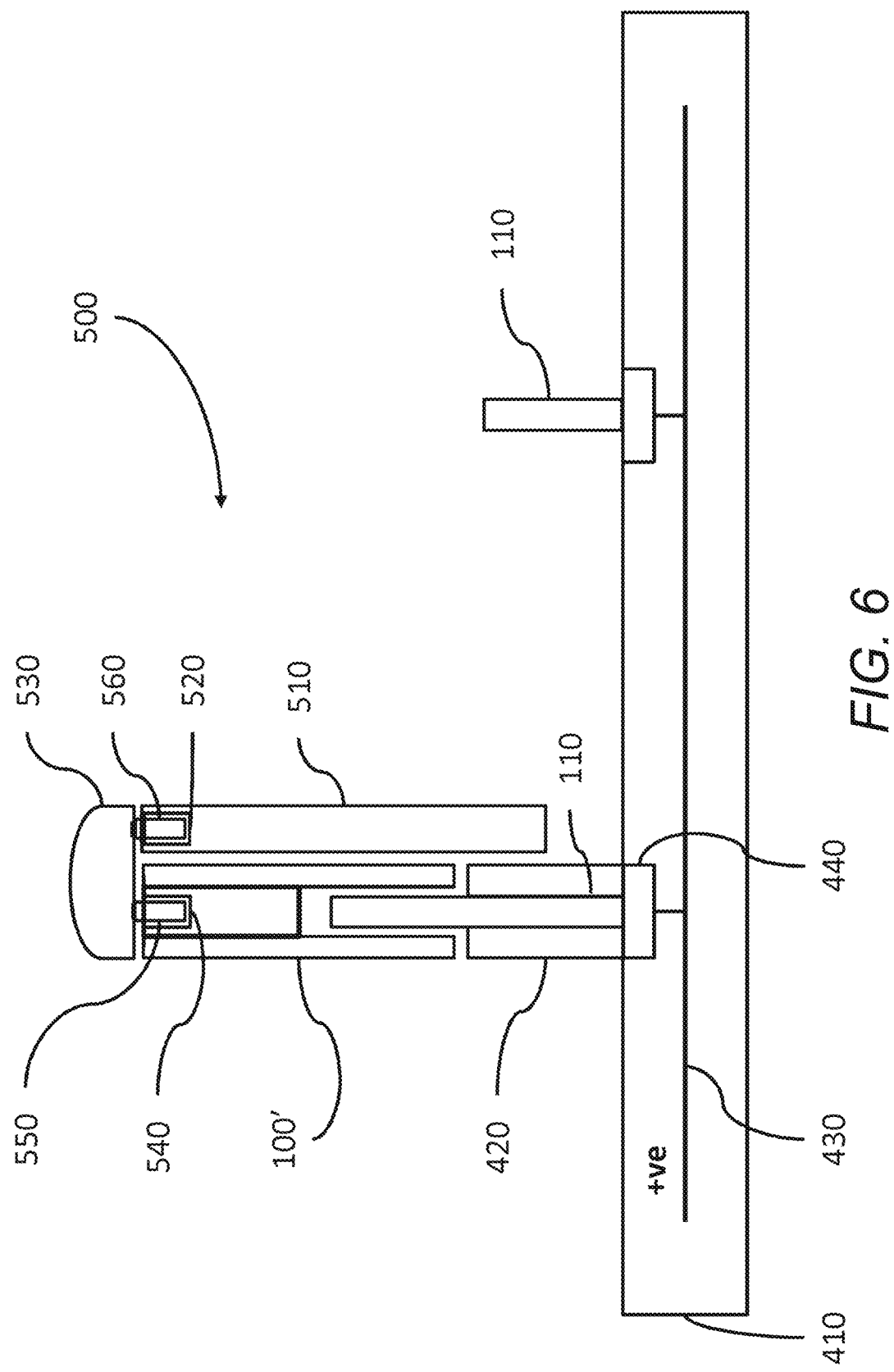
FIG. 6 shows a schematic sectional view of the charging system of FIG. 5 with a further battery powered device arrangement including two devices linked by a connector.

FIG. 6 shows an alternative arrangement 500 of a similar charging dock 410, but housing, supporting, powering and/or charging a device 100' combined with a second device 510, which in this case is a mobile telephone such as an iPhone®. The device 100' contains a power output interface 540 that may be a USB interface, for example. The mobile telephone 510 also includes a USB interface for an iPhone® may be a lightening port. A connector 530 links the two USB interfaces using protrusions 520 and 560 that provide electrical connections between the two devices.

Supports or spacers 420 are shown in FIG. 6 to stiffen the paddle 110 and to support the devices 100 above a base of the dock 410. This also allows the second device 510 to be longer than the device 100' without the extra length of the second device 510 from interfering with the base or surface of the dock 410 (i.e. preventing the paddle 110 from being inserted or sufficiently inserted so that power can be supplied). However, such additional supports 420 may not be required for shorter paddles 110 or if the device itself contains such a support (or where a second device is absent). The supports 420 may be removable.

Power may be supplied to the device 100, 100' to power it directly, power it and charge its battery and/or provide power to a second device 510. The management or control of this power may be handled by a circuit or logic within the device 100, for example. Such management may include logic to preferentially charge the battery partially or wholly at the expense of restricting or preventing power from reaching the second device 510, for example.

Figure 7:
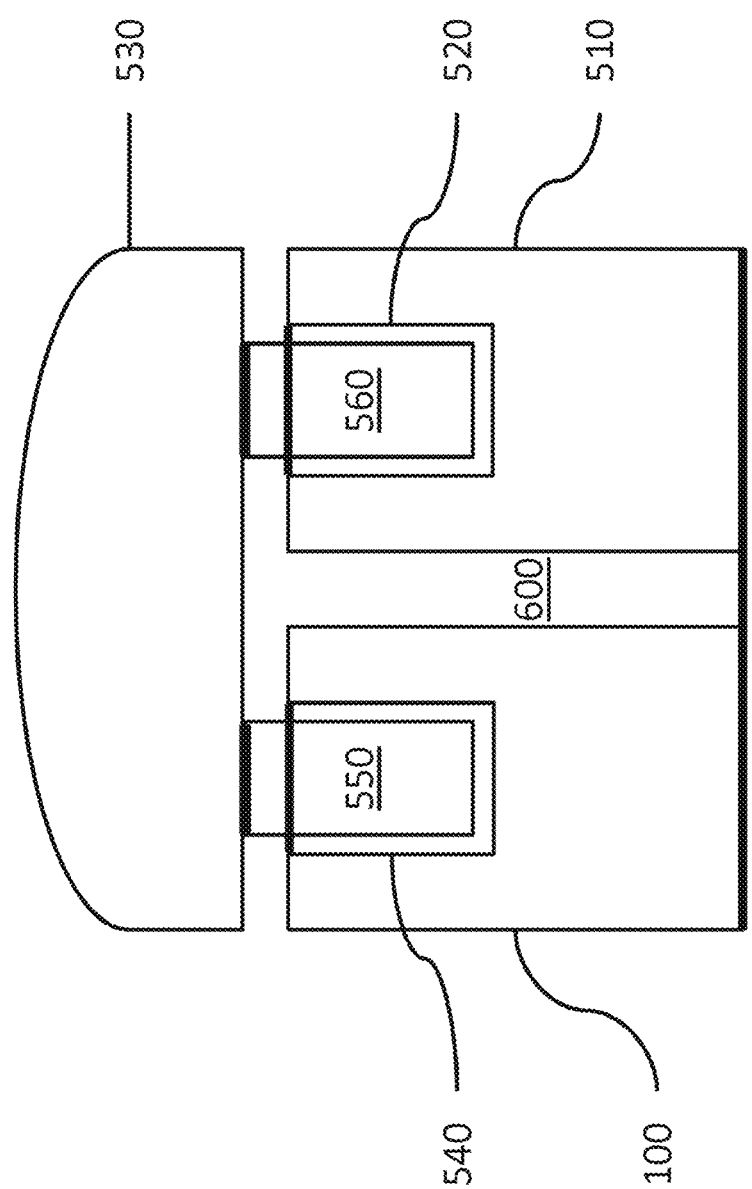
FIG. 7 shows an expanded sectional view of the connector of FIG. 6.

FIG. 7 illustrates this connector in further detail. The space 600 between the devices may be filled with a spacer or a case (not shown in this figure) may hold both devices together.

Figure 8:
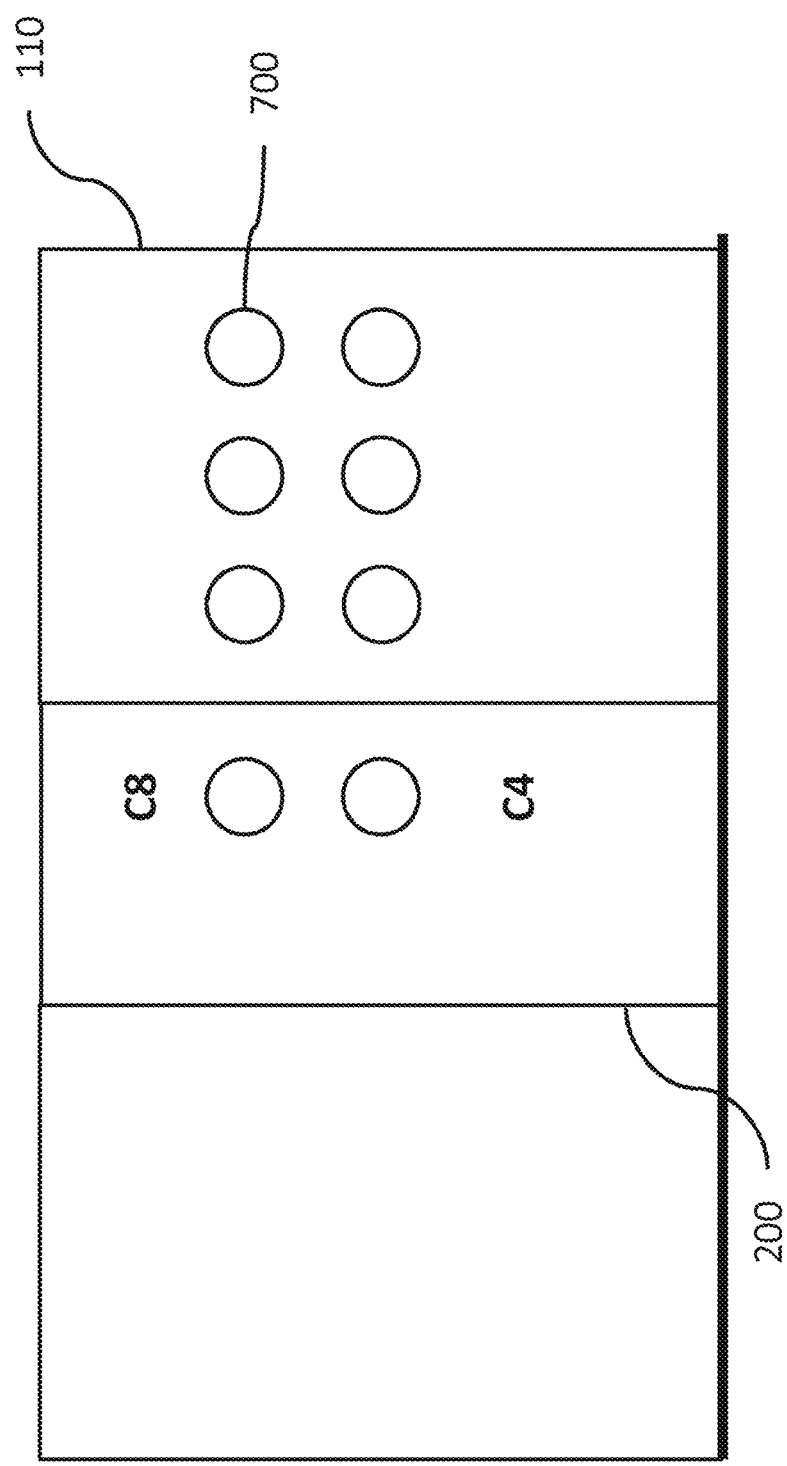
FIG. 8 shows a schematic diagram of a portion of the charging system of FIG. 2, including electrical contacts found within the battery powered device.

FIG. 8 illustrates schematically how the paddle 110 and electrode 200 may overlap and make contact with some of the contact pads 20 (C4 and C8), whilst leaving the other contact pads 20 untouched or not contacted.

As will be appreciated by the skilled person, details of the above embodiment may be varied without departing from the scope of the present invention, as defined by the appended claims.

For example, different voltages may be supplied. The plate may be formed from metal or laminated material. The paddles may be removable. Charging statuses may be shone on the dock. Whilst a charging terminal or dock has been described, this device may provide power for other or alternative purposes (e.g. to operate a device or to provide power for other functions, such as powering one or more devices connected to the device placed on the dock). The term paddle may refer to a substantially flat, planar, rigid or semi-rigid member. It may be formed from single pierce or be laminated to improve strength and robustness. The power receiving contact within the device may alternatively not make any contact at all with a smartcard introduced within the opening of the device. In this case, the opening simply has a dual use of receiving a smartcard and for receiving power. The implementation where the smartcard contact(s) within the device also receives power from the dock may use any of the features or options described with reference to the example implementation of a separate power-receiving contact and vice versa. Whilst the examples provided above describe a device having an aperture that receives at least a complete end of a smartcard (i.e. enclosing two corners of the smartcard) other devices that read or receive smartcards may be used. For example, a device that only receives one corner or even only a part of an edge of a smartcard (or has such a receiving slot) may also receive electrical power in a similar way to the described system and dock.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A battery-powered device comprising:
a power input providing power to the battery-powered device;
a housing having an opening for receiving a smartcard;
at least one electrical contact within the housing, the at least one electrical contact connected to the power input,
an interface configured to supply electrical power received from the at least one electrical contact to a second device; and
a regulator circuit configured to regulate electrical power supplied to the power input,
wherein the at least one electrical contact is further configured to electrically connect to a paddle introduced into the opening of the housing, wherein the paddle is arranged to provide electrical power to the at least one electrical contact.

2. The battery-powered device of claim 1, wherein the at least one electrical contact is further configured to electrically connect to at least one conductive pad on a surface of the smartcard introduced into the opening of the housing or wherein the at least one electrical contact is further configured to make contact with a non-conductive region on the surface of the smartcard introduced into the opening of the housing.

3. The battery-powered device of claim 1, wherein the opening in the housing is configured to receive the smartcard that is a payment card and/or wherein the opening is configured to accept an ID-1 type card entered edge-wise and/or wherein the smartcard conforms to ISO/IEC 7816.

4. The battery-powered device of claim 1 further comprising a conductive plate separated from and opposite to the at least one electrical contact, the conductive plate connected to an electrical ground of the battery-powered device.

5. The battery-powered device of claim 1 further comprising a circuit configured to control the electrical power provided to the second device, wherein the control includes limiting the electrical power provided to the second device in favor of charging a battery within the battery-powered device, limiting the electrical power to charge the battery within the battery-powered device in favor of providing electrical power to the second device and/or preventing electrical power from reaching the second device.

6. The battery-powered device of claim 1 further comprising a connector for attaching the second device and/or a case for joining the battery-powered device to the second device.

7. The battery-powered device of claim 1, wherein the interface is a USB interface.

8. The battery-powered device of claim 1 further comprising a battery in electrical contact with the power input and/or a battery charging circuit connected to the power input.

9. The battery-powered device of claim 1, wherein the at least one electrical contact is a spring-loaded contact.

10. A power supply for one or more battery-powered devices each having at least one electrical contact within a housing configured to make contact with a smartcard introduced into an opening in the housing, the power supply comprising:
a power input;
an electrical output connected to the power input;
one or more paddles, each having at least one electrode connected to the electrical output, wherein each paddle is configured to enter an opening of a battery-powered device for receiving the smartcard, wherein the at least one electrode is configured to provide electrical power from the power input to the least one electrical contact to provide electrical power to the battery-powered device and/or one or more devices connected to the battery-powered device; and
a regulator circuit arranged to regulate electrical power supplied to the power input.

11. The power supply of claim 10 further comprising a battery charging circuit, current and/or voltage regulation circuit connecting the power input to the electrical output.

12. The power supply of claim 10, wherein the paddle is a non-conductive paddle and wherein the paddle is formed from a plastic material.

13. The power supply of claim 10, wherein the paddle has a width of an ID-1 type card.

14. The power supply of claim 10, wherein the at least one electrode is located on the paddle at a position corresponding with a location of at least one conductive pad of the smartcard on an ID-1 type card, wherein the ID-1 type card is an ISO/IEC 7816 or payment card.

15. The power supply of claim 10, wherein a plurality of the paddles are arranged spaced apart and parallel to each other, wherein the paddles are spaced apart to accommodate a plurality of battery-powered devices to be placed on each plate with the one or more paddles inserted into the opening of each housing and charged simultaneously.

16. The power supply of claim 10, wherein the one or more paddles and electrodes are formed from printed circuit boards and/or wherein the one or more paddles have two electrodes located on opposite faces.

17. The power supply of claim 16, wherein when the one or more paddles have electrodes located on opposite faces, the output is configured to provide one electrode with a positive voltage supply or a negative voltage supply and the other electrode is grounded, wherein the grounded electrode is configured to make electrical contact with a conductive plate separated from and opposite to the plurality of electrical contacts within the battery-powered device.

18. The power supply of claim 10, wherein the regulator circuit is disconnectable from the power input and/or wherein the regulator circuit is a switched mode circuit, an AC to DC converter, and/or includes a transformer.

19. A system comprising a battery-powered device and a power supply for one or more battery-powered devices,
the power supply comprising:
a power input;
an electrical output connected to the power input of the power supply;
one or more paddles, each having at least one electrode connected to the electrical output, wherein each paddle is configured to enter an opening of the battery-powered device for receiving a smartcard, wherein the at least one electrode of the one or more paddles is configured to provide electrical power from the power input of the power supply to the least one electrical contact of the one or more paddles to provide electrical power to the battery-powered device; and
a regulator circuit arranged to regulate electrical power supplied to the power input of the power supply; and
the battery-powered device comprising:
a power input providing power to the battery-powered device;
a housing having an opening for receiving the smartcard;
at least one electrical contact within the housing, the at least one electrical contact within the housing being connected to the power input of the battery-powered device; and
an interface configured to supply electrical power received from the at least one electrical contact within the housing to a second device.

* * * * *